July 29, 1941.  K. E. WAGGENER  2,250,688

CUT INDICATING INSIDE CUTTER

Filed Sept. 30, 1940

Inventor,
Kenneth E. Waggener;
By his Attorney,
Frederick E. Maynard.

Patented July 29, 1941

2,250,688

UNITED STATES PATENT OFFICE 2,250,688

CUT INDICATING INSIDE CUTTER

Kenneth E. Waggener, Brea, Calif.

Application September 30, 1940, Serial No. 358,974

7 Claims. (Cl. 164—0.7)

This invention is a self-contained, combined inside pipe or casing cutter and cutting stroke indicator.

In the deep well industry it is a common practice to have to insert a form of cutting-off tool down in the bore of a string of pipe or casing and endeavor to make one or more annular cuts and sever the pipe into a section or sections that may then be fished out of the hole. No simple or practical means has heretofore been known or provided whereby to show that a full cut-off has been made by the tool at the intended operation. In some cases after a given number of cutting operations of the tool at different levels in a hole the tool will be pulled and then a fishing tool will be run in for the purpose of fishing out the cut off sections, or supposedly cut sections. If a section is unpullable the operative at the derrick floor is not aware of whether the piece is irremoveably frozen or whether the tool has failed to complete the cut. In such a case of frozen pipe the run of the fishing tool is a waste of time, labor and expense.

It is an object of this invention to provide a cutting-off tool in which there is provided a simple, practical, reliable and inexpensive means whereby to effectively show that the cutting members of the tool have been successfully actuated to a full cutting stroke so that when the tool is pulled from the hole the operative can, by simple inspection of the indicating means, see that the cutters have been so operated and thereafter run in the fishing tool to catch and pull the "fish" or cut-off section of the pipe down in the hole.

Moreover, an object of the invention is to provide means whereby there is made and kept a record of each successive cutting motion of the cutters of the tool when a plurality of cuts are to be made along the length of a pipe in a hole.

Another object is to provide a cutting-off tool assembly attachable to any conventional operating string common in the well drilling industry and to incorporate in combinative organization therewith a multiple-cutter-action recorder so that the tool and the recorder constitute a completely self-contained assembly for the given purpose ready to be attached to an operating tool string; it being an express purpose of the invention to eliminate need or combination of any form of apparatus beyond the elements of the self-contained tool and recorder, as for instance to eliminate complications of apparatus which include the tool string itself and/or head or derrick works equipment.

Noticeably, an object of the invention is to provide a cutting-off tool of standard and conventional form and which is operative in the usual manner of such tools by the usual tool string so that the operative operates in the customary manner and not only does he not have to change his technique in a cutting-off job, but, moreover, he does not have to watch or attend to special indicating means at the top of the hole, or the derrick floor; the indicator of this invention being completely mounted in, and carried by and actuated in functioning of the tool assembly which commonly includes a pair of coaxially relatively reciprocative organizations, one including a set of trippable wall biting slips to anchor the tool at a given level in a hole, and the other a cutter-carrying and actuating mechanism the latter made operative by the mere lowering of the tool string after the tool has been tripped and set at the given level.

The indicating recorder of this invention involves a means which becomes operative at each reciprocation of the cutting means at each level where a cut is to be performed.

The invention consists of certain advancements in this art as set forth in the ensuing disclosure and having, with the above, additional objects and advantages as hereinafter developed, and whose constructions, combinations, and details of means, and the manner of operation will be made manifest in the description of the herewith illustrative embodiment; it being understood that modifications, variations and adaptations may be resorted to within the scope, spirit and principle of the invention as it is more particularly claimed presently.

Figures 1, 2, 3:
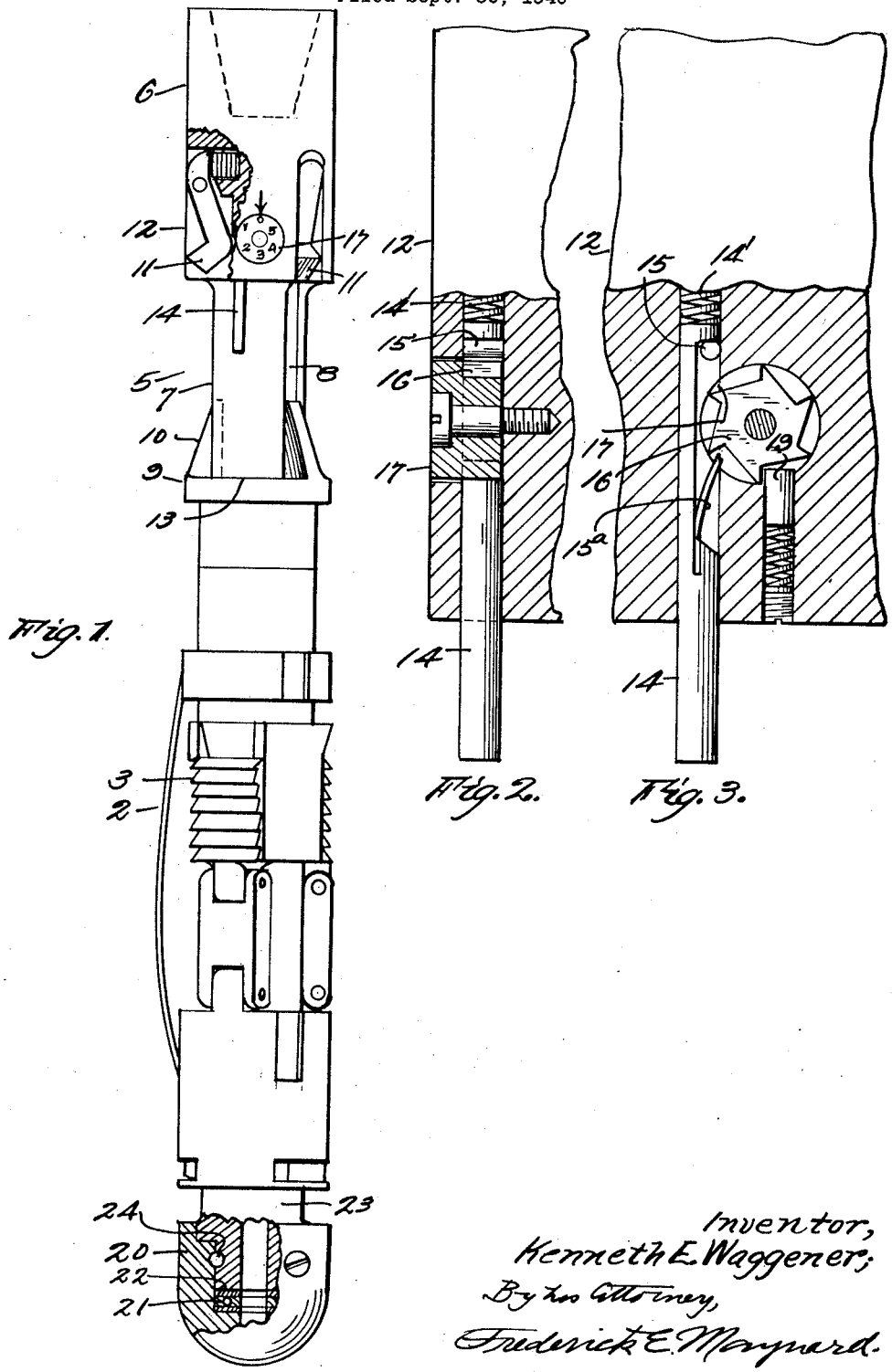
Figure 1 is sectional side elevation of the new cutting-off tool and recorder.
Figure 2 is a detail section axially of the indicator wheel and elevation of the wheel ratchet assembly.
Figure 3 is a detail showing the sectional housing of the ratchet assembly; the latter being in elevation.

The tool organization includes a lower assembly 2 involving a conventional system of slips 3 to be tripped into biting effect on the bore face of a pipe in a hole whereby to position and hold the tool at the level in the pipe at which a cut-off is to be made. An upper assembly 5 has a pin box 6 for attachment to a suitable tool stem or string, not shown, but of conventional type. The assembly 5 has a stem 7 reciprocatively splined at 8 in a cap 9 of the lower assembly 2 and which cap has a number of fixed wedges 10 disposed in the path of movement of opposite, out-facing cutters 11.

After the tool has been set at a given level the assembly 5 moves downwardly until the cutters 11 engage their wedges 10 and subsequent movement downward of the cutters causes the wedges to force the cutters outward into the metal of the pipe or casing to be cut off.

For the purpose of recording and indicating that a full cutting stroke of the cutters 11 has been made there is slidably mounted in the cutter housing 12 a tappet 14 which projects below the said housing and is arranged and adapted to abut a shoulder 13 provided therefor on the cap 9, during descent of the latter.

The tappet is yieldingly pressed downward by a spring 14' in the housing to a degree limited by a stop pin 15 and the spring providing for the repression of the tappet when this is arrested by the cap shoulder 13 during outward cutting motion of the cutters 11.

The tappet is provided with a yieldable detent or ratchet 15ᵃ operative to mutually engage a ratchet wheel 16 pocketed in the housing 12 and fixed to and turning a dial or indicator wheel 17 whose face is exposed at one side of the housing so as to be readily inspected when the tool is pulled from the well or hole.

As the cutter assembly 5 descends and the cutters 11 are forced in an outward, cutting stroke in the pipe the tappet engages its arresting shoulder 13 on the cap and the ratchet 15ᵃ turns the wheel 16 and the indicator 17 a sufficient degree to show that a cutter stroke has been completed; the indicator 17 turning as to a fixed mark 18 on the face of the housing.

When the housing recedes from the wedge-carrying cap 9, either to pull the subjacent assembly from the hole or in preparation for making another set of the tool and another cut operation, the tappet 14 is pushed to carry the ratchet 15ᵃ past the toothed wheel 16 for another turning function thereon; the wheel 16 meanwhile being held against reverse turn by a spring bolt 19.

It will now be apparent that with this indicating cutting-off tool the operative will now be advised that the pipe has been cut at places intended, and then when fishing out the parts if one seems unpullable he knows that it is held fast by the formation wall or some obstacle even though the part has been successfully cut.

The lower end of the slip assembly of the tool is provided with a rotative shoe 20 having an antifriction step bearing 21 against the transverse end face 22 of the mandrel 23 and an antifriction, lateral thrust bearing 24 is interposed between the mandrel and the side wall of the shoe. The purpose and advantage of this rotative shoe is to prevent the dead locking of the tool and its twist-off as frequently occurs when the conventional rigid shoe end tool is employed. By this improved rotatively connected mandrel and shoe the shoe may jam on an obstruction in a well or hole and yet the string thereabove may be freely rotative to the effective completion of its function and elimination of string jamming and twist-off.

What is claimed is:

1. A tool having inside cut-off cutters, and in combination, a stroke registering indicator self-contained in the tool structure and including tool actuated means acting concurrently with the functioning of the cutters and operatively connected to the registering indicator; the tool having a cylindric body within the peripheral limit of cross-area of which the indicator is disposed on the tool.

2. A tool as in claim 1, and said tool including a slip assembly and a cooperative cutter assembly and the indicator being mounted in one of the said cutter assembly.

3. A tool structure adapted for ready attachment to a tool string, for well drilling or operation, and having repeat action cutters, and register means mounted in the tool structure and having means operative thereby to register and indicate one or more actions of the cutters; said register means including a dial countersunk and visible in the peripheral face of a member of the tool structure.

4. An inside cutting-off tool for attachment to a tool string, and a register, means carried by the tool and including tool actuated mechanism to record cutting strokes made by the tool while in a body to be cut; said tool including a member telescopic and rotative in the body to be cut and the said mechanism being sunk in said member and having an indicator exposed for ready inspection.

5. An inside cutting-off tool attachable to a tool string and having cutting members actuated by relative movement of devices of the tool structure, and the tool having a recording indicator incorporated therein and including mechanism cooperative with said devices to effect register of cutting strokes of the said members, one of said devices including a cylindric element slidably fittable in a body to be severed by the cutter and said mechanism being housed within said element and presenting an indicator part at the periphery thereof.

6. An inside cutting-off tool having a section carrying cutting members and a section carrying bore-face engaging slips to set the tool fixedly in the bore for cutting operation, one of the sections having recording means to show completion action of the said members and the said means including mechanism being operative by relative closing motion of said sections after the slips have been set.

7. An inside cutting-off tool having relatively movable sections and a cutting stroke recording indicator carried by one of the sections and including a part actuative by the other section to record a cutting stroke; said indicator including a recorder element exposed for ready inspection and mechanism mounted and arranged on one of the sections within the cross-area prescribed by the carrying section, and a member operative by the other section and whereby said mechanism actuates said indicator.

KENNETH E. WAGGENER.